United States Patent [19]
Radosav et al.

[11] Patent Number: 5,114,163
[45] Date of Patent: May 19, 1992

[54] SPLIT MECHANICAL FACE SEAL

[75] Inventors: Jon J. Radosav, Des Plaines; Thomas A. Evans, Schaumburg; David M. Dudek, Palatine; Russell G. Wieser, Vernon Hills; Brian J. Atwater, Chicago; Robert J. Eisbrenner, Glenview, all of Ill.

[73] Assignee: John Crane Inc., Morton Grove, Ill.

[21] Appl. No.: 529,208

[22] Filed: May 25, 1990

[51] Int. Cl.$^5$ ............................................. F16J 15/38
[52] U.S. Cl. .................................... 277/81 S; 277/92; 277/85; 277/192; 277/195; 277/198
[58] Field of Search ............... 277/81 S, 81 R, 92, 277/85, 93 R, 93 SD, 187, 195, 198, 182, 186, 192, 197; 384/139, 481, 590

[56] References Cited
U.S. PATENT DOCUMENTS

| | | | |
|---|---|---|---|
| 2,855,003 | 10/1956 | Thaxton | 277/192 |
| 2,921,806 | 1/1960 | Carter | 277/93 R |
| 2,995,391 | 8/1961 | Snyder | 277/92 |
| 2,996,319 | 8/1961 | Copes | 277/81 S |
| 3,025,070 | 3/1962 | Copes | 277/81 S |
| 3,031,199 | 4/1962 | Laser et al. | 277/93 |
| 3,061,319 | 10/1962 | Snyder | 277/92 |
| 3,117,796 | 1/1964 | Liebig | 277/192 X |
| 3,291,493 | 12/1966 | Blair | 277/92 |
| 4,410,188 | 10/1983 | Copes | 277/81 S |
| 4,417,503 | 11/1983 | Izumi | 277/205 X |
| 4,421,329 | 12/1983 | Jelinek | 277/192 X |
| 4,423,878 | 1/1984 | Escue | 277/81 R X |
| 4,576,384 | 3/1986 | Azibert | 277/81 S |
| 4,809,992 | 3/1989 | Kemp, Jr. et al. | 277/81 S X |
| 4,842,286 | 6/1989 | Heilala | 277/81 S X |
| 4,858,936 | 8/1989 | Adams | 277/192 X |

FOREIGN PATENT DOCUMENTS

| | | |
|---|---|---|
| 0186811 | 7/1986 | European Pat. Off. . |
| 0312196 | 4/1991 | European Pat. Off. . |
| 2646475 | 12/1977 | Fed. Rep. of Germany . |
| 612484 | 7/1979 | Switzerland . |
| 724301 | 2/1955 | United Kingdom .......... 277/192 |
| 878371 | 9/1961 | United Kingdom .......... 277/81 S |
| 917693 | 2/1963 | United Kingdom .......... 277/81 S |
| 941849 | 11/1963 | United Kingdom .......... 277/81 S |
| 2119875 | 11/1983 | United Kingdom . |

Primary Examiner—William A. Cuchlinski, Jr.
Assistant Examiner—J. Folker
Attorney, Agent, or Firm—Kinzer, Player, Dorn, McEachran & Jambor

[57] ABSTRACT

A totally split mechanical face seal being installable and replaceable without necessitating breakdown of the shaft and/or housing. The inventive split seal is well suited for replacement of packing or stuffing in heavy duty or inaccessible locations. The inventive seals include a sealing element that seals the primary ring against the shaft and rigidly positions the primary ring in the axial, circumferential and radial directions, and also includes a sealing element which seals the mating ring against the housing and non-rigidly positions the mating ring in the axial diection while simultaneously providing an axial biasing force on the mating ring to provide mating contact of the two rings.

24 Claims, 5 Drawing Sheets

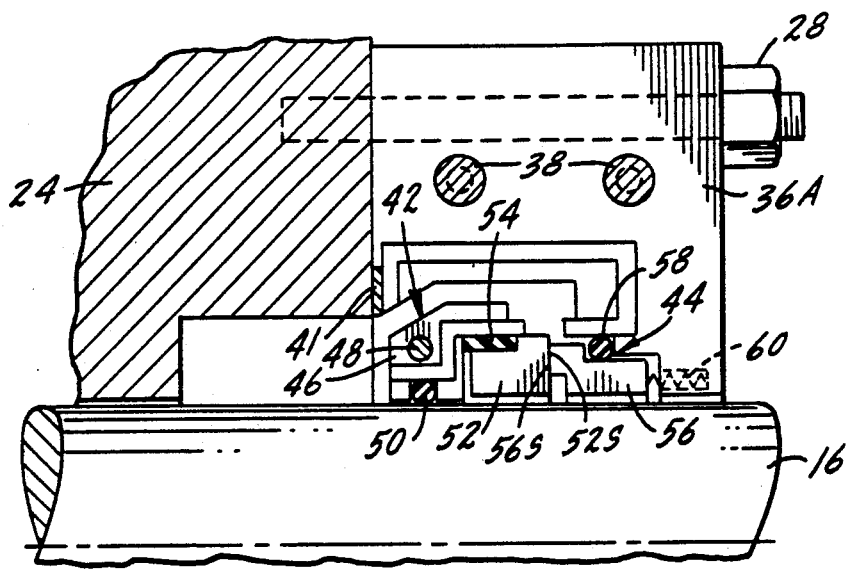
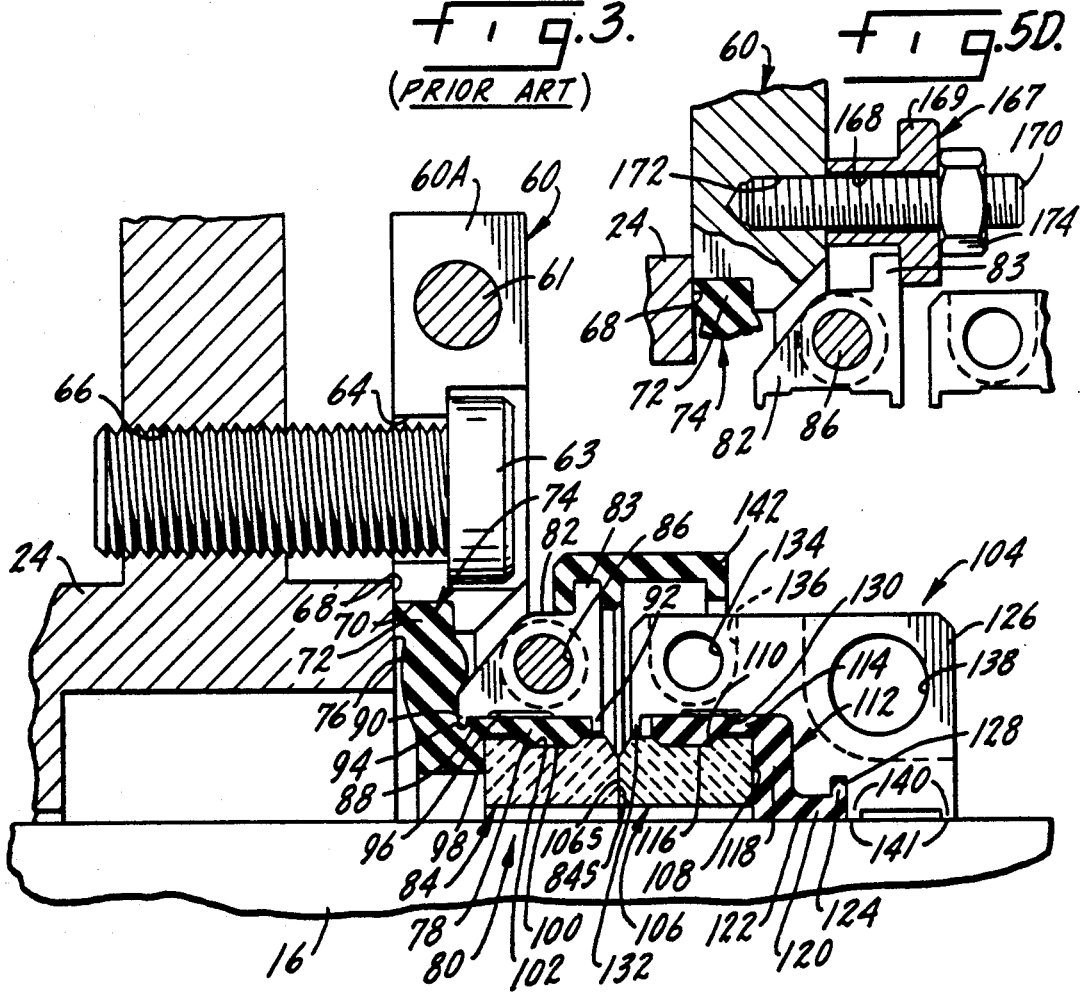

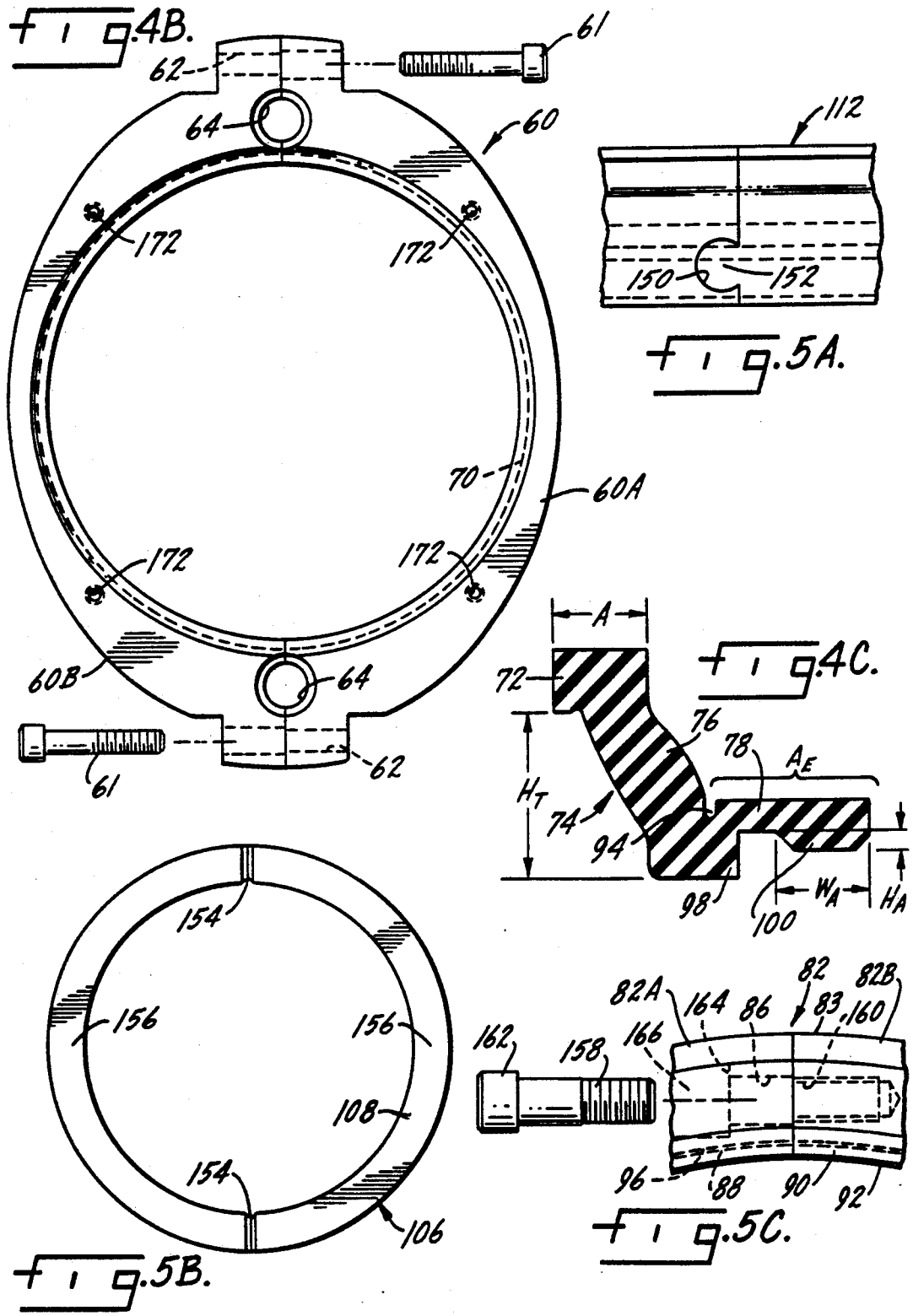

SPLIT MECHANICAL FACE SEAL

BACKGROUND OF THE INVENTION

1. Field of the Invention

This invention relates to mechanical seals for sealing between relatively rotating elements and more particularly to split mechanical face seals.

2. Background Art

Mechanical face seals are used with a wide range of equipment, for example, turbines or pumps, that have a housing and a shaft which rotates relative to the housing. Similarly, a large number of pumps, compressors, mixers and agitators in chemical process industries, refineries and petrochemical industries, as well as a number of other industries, utilize packed stuffing boxes around their rotating shafts. It has been found generally desirable to replace the packing in stuffing boxes with mechanical face seals for reducing high maintenance costs, preventing environmental contamination, reducing product loss and for other reasons.

Failure or operational deterioration of mechanical seals also is a problem. Repair or replacement of parts of such seals may be difficult due to the inaccessible location in the equipment of the component parts. Often, because of the design of the equipment, it is difficult or impossible to remove a damaged seal component beyond the shaft end or to install a replacement component. Repair of the equipment in those cases requires entire disassembly, replacement and reassembly of the housing and component parts of the seal and the equipment.

Replacement of packing or repair of damaged seals has been facilitated by seal designs where a portion or all of the component parts of the mechanical seals are segmented or split. Installation of split or partially split seal components can be performed without necessitating the complete breakdown of the equipment and without having to pass the annular seal over an end of the shaft. Examples of split or partially split seals can be found in U.S. Pat. Nos. 3,025,070, 3,184,244, 4,423,878, 4,575,098, 4,576,383 and 4,576,384. Although the devices taught by these patents may have been appropriate for the purposes for which they were intended, each of the designs disclosed therein is either overly complicated by an overabundance of component parts or disposed toward designs which have short periods between seal failures.

SUMMARY OF THE INVENTION

It is therefore an object of this invention to provide a split mechanical face seal that is easily removed and replaced without necessitating removal of a housing and breakdown of the other components of the equipment.

It is another object of the present invention to provide a split seal assembly capable of replacing packing either in stuffing boxes or in defective mechanical face seals quickly, easily and efficiently, and without necessitating the full breakdown of the equipment.

Accordingly, there is provided a split mechanical face seal for providing fluid-tight sealing between a housing and a shaft adapted to rotate relative thereto, the seal including adjacent, rigid, annular primary and mating rings each defining generally radial opposed sealing faces, each of the rings having a plurality of arcuate ring segments and means for joining and retaining the segments of each of the rings in rigid connection with the other segments of each ring, whereby each said mating sealing face defined by said rings has a smooth surface devoid of discontinuities around the complete circumference of each respective annular ring, and a plurality of resilient split positioning means for supporting each of the rings in a generally coaxial relationship with the shaft and with the other of the rings, the positioning means defining the relative positions of the rings so that the sealing face of each ring is in opposite and facing relationship to the sealing face of the other ring, one of the positioning means rigidly supporting the primary ring and the other of the positioning means non-rigidly supporting and biasing the mating ring in an axial direction against the primary ring.

The means for joining and retaining the plurality of arcuate ring segments may comprise a plurality of split holder means for circumferentially supporting each of the positioning means in a substantially concentric relationship to the respective ring, the split holder means comprising a pair of semicircular holder members releasably attachable to each other and when in an attached condition, sealingly engaging and compressing to a limited degree at least a portion of the respective resilient positioning means, wherein the resilient positioning means which position the mating ring and said respective holder member supporting the mating ring are shaped and dimensioned to inhibit translation of the mating ring in the radial and circumferential direction relative to the housing and to provide to the mating ring and to the respective holder member a limited range of translation in the axial direction relative to the housing.

BRIEF DESCRIPTION OF THE DRAWINGS

FIG. 3 illustrates a known split seal arrangement for use with a stuffing box housing from which the packing has been removed;

FIG. 4A illustrates in cross section a split seal according to the present invention for use with a stuffing box housing from which the packing has been removed;

FIG. 4B illustrates an elevational side view of the split gland plate utilized in the present invention;

FIG. 4C illustrates a detailed cross section of the mating sealing element utilized in the present invention;

FIG. 5A illustrates in detail a joint between two ends of an annular sealing element of FIG. 4A;

FIG. 5B illustrates a back view of an annular sealing ring ready for splitting for use with the present invention;

FIG. 5C illustrates a cutaway detailed view of the joint of two halves of a holder for use with the present invention;

FIG. 5D illustrates in cross section a detailed view of a compression gear for use with the present invention;

DETAILED DESCRIPTION OF THE PREFERRED EMBODIMENT

Figure 1:
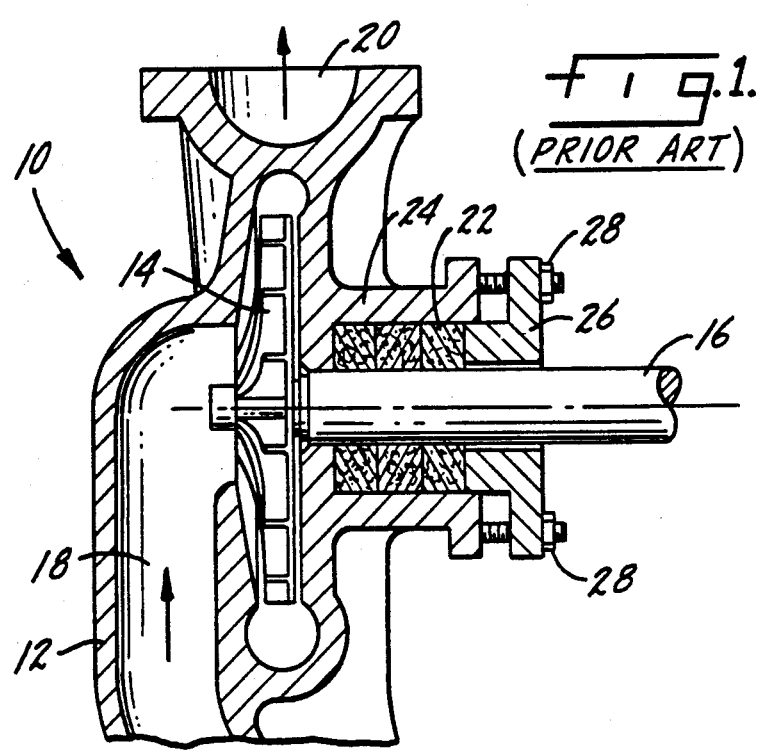
FIG. 1 illustrates schematically and partially in section a conventional pump sealed with packing.

An example of conventional packing in a stuffing box is shown in FIG. 1, which illustrates a pump 10 comprising a housing 12, impeller 14 driven by a drive shaft 16, a fluid input chamber 18 and a fluid output chamber 20. Fluid is normally pumped by the impeller 14 through the chambers 18 and 20 in the direction of the arrows.

Packing 22 is intended to prevent leakage of the pumped fluid to the exterior along drive shaft 16. Packing 22 is conventionally jam packed within stuffing box housing 24 into sealing contact with drive shaft 16 by packing follower 26. The pressure exerted by packing follower 26 against packing 22 is increased or decreased by tightening or loosening gland nuts 28, two of which are shown.

Figure 2:
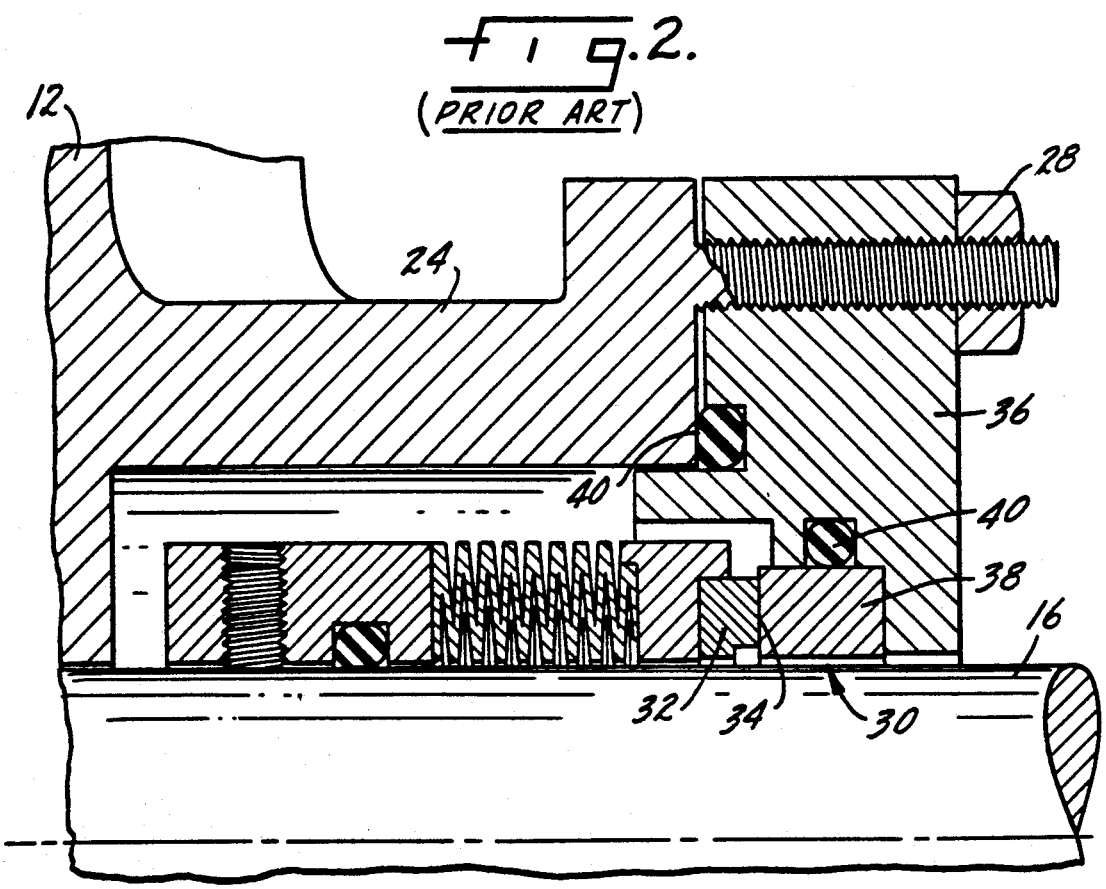
FIG. 2 illustrates in cross section a conventional mechanical face seal arrangement for use with a stuffing box housing from which the packing has been removed.

FIG. 2 illustrates the prior art method of replacing packing 22 with a rotary mechanical seal 30 having a seal ring 32 with a sealing face 34, usually lapped to a high degree of flatness. For an assembly not having a split seal, such as that described in U.S. Pat. No. 3,961,799, installation is preceded by removal of the means providing a driving force to the shaft 16, such as a motor (not shown), and then removal of the follower 26 and withdrawal of the packing 22. After removal of packing follower 26 and packing 22, rotary mechanical seal 30 is installed.

A special gland plate 36 having a mating ring 38 and 0-rings 40 is fastened to stuffing box housing 24 by means of gland nuts 28. Gland plate 36 must be fabricated to fit each size stuffing box. Since each size of drive shaft 16 normally has three sizes of stuffing boxes for various sealed, shafted equipment, this means that a special gland plate must be made for each size stuffing box housing.

FIG. 3 illustrates a cross-sectional view of a split seal design of a seal for replacing packing in a stuffing box, as is shown and described in U.S. Pat. No. 4,576,384. A special gland plate assembly comprises a first gland plate half 36A that is attached to a second gland plate half (not shown) by socket head cap screws 38. The gland plate assembly is connected to the stuffing box housing by gland nuts 28. A split elastomeric face gasket 41 seals the gland assembly to the stuffing box housing 24. The gland plate assembly houses a rotary split seal ring assembly 42 and a stationary split seal ring assembly 44.

Rotating split seal ring assembly 42 is held in place around shaft 16 by holder halves of which one half 46 is shown with attachment means, for example, socket head cap screws 48. Tightening cap screws 48 clamps the holders 46 over 0-ring 50 thus sealing the holder 46 to the shaft 16. Rotating ring 52, also split, is sealed to holder 46 by a split elastomeric boot 54.

Stationary split seal ring 56 is sealed to the gland plate assembly 36A by an 0-ring 58. Plural springs disposed in appropriate bores in gland plate assembly 36A, of which one spring 60 is shown, provide an axial bias against the stationary ring 56 to bring together the sealing faces 52S and 56S of the respective rings 52 and 56. The seal as described in U.S. Patent No. 4,576,384 requires an undue amount of effort and expertise for installation. Installation of the seal requires fluid sealing of joints in split elastomeric elements (40, 50, 54, 58) in at least four positions.

Moreover, all of the separate elastomeric elements are installed simultaneously with at least four other rigid elements, each of which is split. The number of elements that must be kept in place during the installation process while simultaneously screwing together split parts is burdensome. Occasions to misjoin and misalign the split elements either in relation to their split corresponding parts or in relation to the other elements of the respective assemblies 42 or 44 are prevalent.

FIG. 4A is a cross-sectional view of the split seal according to the present invention. Stuffing box housing 24 and shaft 16 are in the relative positions as those shown in the prior art devices of FIGS. 1-3. FIG. 4B illustrates in an elevational side view a gland plate assembly 60 having two split halves 60A and 60B. The split halves 60A and 60B forming the gland assembly plate 60 are identical to each other and are split along a vertical plane as shown in FIG. 4B. One half 60A is rotated 180° relative to the other half 60B when the two halves are joined to each other to form gland plate assembly 60.

Referring now to both FIGS. 4A and 4B, the gland plate assembly 60 includes an attachment means, such as socket head cap screws 61, which screw into a threaded hole 62 in the respective complementary half gland plate to form the gland plate assembly 60 that completely surrounds the shaft.

The gland plate assembly is attached to the housing 24 directly, as in the prior art, by bolts 63, one of which is shown in FIG. 4A having been inserted through a hole 64 in gland plate assembly 60. A bolt head abuts a shoulder in hole 64 as the bolt 63 screws into a threaded hole 66 in housing 24. The precise technique for mounting the gland plate 60 onto stuffing box housing 24 is not a critical part of the invention, and other methods, such as those shown in the prior art can be utilized. One size of the gland plate assembly 60 can be made to fit a majority of stuffing box housings, the only requirement being a clean lateral surface 68 on the stuffing box housing 24. Threaded bores 172 shown in FIG. 4B are evenly disposed around the circumference of gland plate assembly 60 and will be used in the installation of the seal as is discussed below with reference to FIG. 5D.

Referring now to FIGS. 4A and 4C, a gland plate assembly 60 includes a recessed inner diameter 70 which engages a lip 72, itself integrally attached at an outer diameter of a split elastomeric sealing element 74. Sealing element 74 is alternatively referred to as a compression ring 74 because one function is to compress the elements of the seal together. The axial dimension A of lip 72 should be just slightly larger than the width of recess 70 but the lip 72 should easily fit within the inner diameter of the gland plate assembly 60. The gland plate assembly 60 will squeeze the lip 72 against the lateral surface 68 of stuffing box housing 24 when assembled. A clean lateral surface 68 will thus ensure a close, tight fit and a good seal between the gland plate assembly 60 and the stuffing box housing 24.

Sealing element or compression ring 74 includes a middle section 76 which biases an essentially tubular extension 78 at the opposite end of sealing element 74 from lip 72. Tubular extension 78 engages a stationary split seal ring assembly, which in this embodiment is a mating ring assembly, and is generally designated by the numeral 80 in FIG. 4A. The sealing element 74 is constructed in a way that when fully assembled, it seals against leakage of fluid under moderate pressure from one side of the seal to the other. The sealing properties will be discussed below. FIG. 4C shows a cross section view of sealing element 74 in a non-stressed position, whereas the view of FIG. 4A shows the sealing element 74 in a stressed position.

The resiliency of the middle section 76 of elastomeric element 74 together with the structure of component parts of the ring assembly 80 create an axial biasing force which pushes the interconnected ring assembly 80 away from the stuffing box housing 24. Moreover, this biasing force is adjustable since the amount of force provided in the axial direction depends on the axial position of ring assembly 80. For example, a greater axial biasing force will be provided if the sealing element 74 is compressed to a greater degree by shifting the ring assembly 80 toward the stuffing box housing 24.

Stationary mating ring assembly 80 comprises a split holder 82, including the component parts, 82A and 82B, and a split mating sealing ring 84, having a sealing face 84S. Holder 82 comprises two halves 82A, 82B, each of which includes a through hole 86 for insertion of a bolt 162, further described with reference to FIG. 5C below. Each of the two bolts will engage a corresponding screw-threaded hole on the complementary half of holder 82 and tightening of the bolts will form a unitary annular assembly for holding and postioning the stationary mating sealing ring 84. An annular flange 83 extends from the circumferential outer edge of holder 82.

Holder 82 comprises a hard material, such as metal, and at its inner diameter portion 88 provides support to the outside surface of tubular extension 78. An inner diameter portion 88 is defined by a flange member 90 at one end and a second flange member 92 at the other end. Flange member 90 fits into a corresponding groove 94 in the tubular extension 78.

Inner diameter portion 88 further includes a recess 96 which can collect any excess elastomeric material which results from compression of tubular extension 78. Similarly, tubular extension 78 does not extend to the total axial width of inner diameter portion 88, i.e. up to flange member 92, and thus provides a volume into which excess compressed elastomeric material from tubular extension 78 can extend when holder 82 is screwed together.

The inside surface of tubular extension 78 engages mating sealing ring 84. Sealing ring 84 comprises a pair of split halves that are joined together and surrounded on the outer circumference by tubular extension 78. A flanged portion 98 of tubular extension 78 provides axial support to sealing ring 84 and biases the ring 84 away from the stuffing box housing 24. An abutment 100 on the inside surface of extension 78 fits snugly into a reciprocal shallow groove detent 102 in the circumference of sealing ring 84.

Sealing member 74 provides axial, radial and circumferential support to sealing ring 84, and also seals the passage between ring 84 and holder 82. The sealing member 74 also seals the housing 24 against the gland plate assembly 60 by compressing lip 72 against surface 68. The sealing member 74 also provides an axial biasing force to the ring assembly 80.

The dimensions of sealing member 74 are dependent on the diameter of shaft 16 and on the remaining elements with which sealing element 74 engages, such as primary ring 84 and gland plate assembly 60. Certain dimensions, such as the axial width $A_E$ of tubular extension 78 and the height HA and width WA of the abutment 100, can be set at standard values which match the standardized dimension of the ring groove and the holder for different size seals. The height $H_T$ of the transition portion 76 may also be set to a standard height as long as $H_T$ is large enough to enable sealing lip 72 to engage the surface 68 for a majority of sizes of stuffing box housings 24.

Referring again to FIG. 4A, rotating split seal ring assembly, generally designated 104, in this embodiment is a primary ring assembly. It includes a split primary sealing ring 106, having a sealing face 106S which is in direct, opposing relationship to face 84S of the mating ring 84. A surface 108 extends radially at an opposite side of ring 106 in a plane generally parallel to sealing face 106S. The split halves of the sealing ring 106, when joined, form an annular member with a detent 110, similar to detent 102 on ring 84, for receiving an abutment member which together facilitates the axial and radial positioning of ring 106.

Ring assembly 104 also comprises a rotating elastomeric sealing element 112 that has a tubular extension portion 114 that fits around and provides support to the primary sealing ring 106. An abutment 116 disposed on the inside surface of a tubular extension portion 114 has a shape that is reciprocal to and fits snugly within detent 110 in the outer diameter surface of ring 106. Transition portion 118 of sealing element 104 provides axial support to the radially extending surface 108. The elastomeric properties of tubular extension portion 114 and transition portion 118 effectively seal ring 106 to prevent fluid from passing between ring 106 and sealing element 112.

Sealing element 112 further comprises a shaft sealing portion 120 having an inside surface 122 which effectively seals the fluid path between element 112 and shaft 16. A flanged lip 124 at the end of shaft sealing portion 120 cooperates with a rotating holder 126 to seal the shaft sealing portion 120 against the holder 126. Insertion of the lip 124 into a grooved detent 128 in the inside surface of holder 126 and compression of the shaft sealing portion provides good sealing capacity.

The inside surface of holder 126 generally follows the outline of the outside surface of sealing element 112 so as to create a more effective seal between the holder 126 and sealing element 112 and to rigidly support ring 106. Holder 126 also provides a shallow groove 130 and a space between flange 132 and tubular extension portion 114 for receiving excess elastomeric material from element 112 when it is compressed in the assembled position. The sealing element 112 is split as are all the elements of the rotating ring assembly 104. The axial and radial dimensions of sealing ring 106 and of sealing element 112 may also be matched to standard values so that the sealing element may be usable with different size shafts.

The rotating holder 126 is split in two halves, one half of which is shown in FIG. 4A. Each half comprises a through hole 134 with a flanged abutment 136 (shown in phantom). A bolt (not shown) is passed through hole 134 and its head engages the flanged abutment 136. The bolt is screwed onto a threaded bore (not shown) in the complementary half of the holder 126 to unite the holder. As the bolt is screwed into the complementary half of holder 126, the assembled unitary holder provides sealing pressure on the sealing element 112.

A second through hole 138 may be provided to thoroughly secure the holder 126 about the shaft 16. The holder 126 has a pair of flanged, annular supports 140 having an inner diameter surface 141 which directly contact shaft 16. The supports 140 are the base which maintains the holder 126 in a predetermined secured position in the axial direction along shaft 16. Tightening of the bolts (not shown) which fit through holes 134 and 138 provides a positive drive capability that results in friction engagement of the shaft 16 with the support surface 141 and with surface 122 of element 112. The positive drive capability avoids axial and circumferential translation of the rotating mating split seal ring assembly 104 with respect to the shaft 16. The holder 126, as is holder 82, also disposes two identical halves at 180° relative to each other for attachment, much as is the gland plate assembly 60 shown in FIG. 4B.

The predetermined axial position of the ring assembly 104 also illustrates another very important aspect of the present invention. The ability to slide the ring assembly 104 along the shaft 16 to a predetermined position permits the assembler of the split seal device to pre-stress the amount of axial spring force which the sealing element 74 provides in biasing the sealing face 84S against sealing face 106S. The amount of spring force provided by element 74 is dependent on the axial position of stationary mating ring assembly 80 which in turn depends on the axial position of the rotating primary ring assembly 104. The operator can slide the rotating ring assembly 104 to the predetermined position along shaft 16 to provide exactly the axial spring force which is desired from the sealing element 74. The pre-stressing capability of this invention is an important characteristic for effective sealing of devices.

An optional elastomeric cover guard 142 is disposed over flange 83 of the stationary holder 82. A detent in the inner surface of guard 142 fits snugly over the flange 83. The guard protects the seal and the sealing faces 84S and 106S from debris. The guard also deflects any of the sealed fluid which is slinging out of the seal faces as the shaft 16 and seal ring 106 rotate at high speed.

Assembly of the seal is performed easily and efficiently. Using the replacement of packing by a mechanical seal as an example, the packing is first removed from the stuffing box housing 24. An elastomeric sealing element 74 having predetermined dimensions, as shown in FIGS. 4A and 4C in cross section, is provided for circumferentially press-fitting within the gland plate recess 70. Manufacture of the sealing element 74 and of the sealing ring 84 precedes their assembly into a seal.

The sealing element 74 may be manufactured by forming an entire sealing element ring having the desired dimensions and then cutting through the ring with a knife. Cutting or splitting the ring will permit slipping the sealing element 74 around shaft 16. The preferred technique of cutting the sealing element 74 is straight radial cut. Alternatively, the cut may be made at an angle to the perpendicular, thus allowing some play in fitting the cut ends together during assembly. An angled cut also provides better sealing characteristics when the two cut ends are pressed together during assembly. As will be discussed below, the sealing properties of sealing element 74 are further enhanced by the inventive design, which relies on the hoop stress inherently present in the middle section 76 of the sealing element 74 to provide a sealing capacity for fluids even if the fluids are under moderate pressure.

An alternative technique is to have a long, wound coil of extruded elastomeric material having a cross section as shown in FIGS. 4A and 4C. The required predetermined length which will fit around recess 70 of the coil is cut, preferably at an angle. Different lengths can be cut to fit different sizes of shafts used in pumps or turbines. Using sealing element 112 as an example, the cut can be made by a special cutting jig so that two interlocking round ends 150 and 152 of the coil length, shown in FIG. 5A, can be spliced together to form an effectively continuous annular sealing element. Alternatively, a dovetail shape (not shown) may be cut and spliced to form the sealing element 74.

The two halves 60A and 60B of the gland plate assembly 60 are then brought together, making sure that the lip 72 of sealing element 74 is within the recess 70 in the inner diameter of gland plate assembly 60. The gland plate assembly 60 is screwed together by bolts and is then brought against stuffing box housing 24 with care to insure that lip 72 is flush with the surface 68 around the complete circumference of recess 70. A thin film of sealant, such as RTV SEALANT made by Dow-Corning Corp., preferably is coated onto surface 68 of the stuffing box housing 24 where the lip 72 of compression ring 74 will contact so as to increase the sealing capabilities. The gland plate assembly 60 is then attached to the stuffing box housing 24 by screwing bolt 63 into threaded bore 66. At this stage, the bolt 63 should not be tightened completely in bore 66. The two halves of stationary primary ring 80 are then assembled by placing them into the inner diameter of tubular extension 78 one at a time, making sure that the sealing face 84S, having a beveled outer edge, faces outward. The other half of the sealing ring 84 should be placed into the tubular extension with care, making sure that the split in the sealing ring 84 is 90° relative t the split in the compression ring 74. Disposing the split at a 90° angle provides better sealing capability.

The two halves of the stationary primary ring 84 match perfectly at the joint ends because of the technique by which they are manufactured. Manufacture of sealing ring 106 is identical and will be herein described by way of example.

FIG. 5B illustrates ring 106 in a front view of the radially extending surface 108. The ring is first manufactured as an integral ceramic or carbon sealing ring 106. The sealing ring 106 is then lapped to a smooth, optically flat finish as is done with a sealing ring which is not intended for splitting. Two diametrically opposing notches 154 are then ground into surface 108 and around the edge of surface 108 and into the inner diameter of the ring. The notches should be ground to a sufficient depth to cause slight weakness in the ring but not so deep that the ring fails to maintain its sealing properties. Optimally, the depth of notches 154 should be about 10% of the thickness of ring 106, or about 10% of the distance between faces 106S and 108.

A tool with cutting edge (not shown) is then placed in the notches and pressure is carefully exerted on the face 106S of ring 108 at points approximately 90 degrees from the notches 154 on the ring, or at about the areas designated 156 on the ring. Exerting careful but steady pressure on the back side 108 against the ring 106 causes the tool edge to create a stress at the notches 154. The pressure at points 156 is increased until the ring snaps into two pieces at the notches. The junction of the two pieces will be jagged, but the technique forms two perfectly matching surfaces that fit together well in a joint that is apparently continuous across the ring surface 106S. The characteristics of the jagged surfaces between ring ends also provides a much better sealing capability than does a flat end joint.

Returning once again to assembly of the seal with reference to FIG. 4A, the ring 84, which has been manufactured using the above technique, is joined together and fit into tubular extension 78. Abutment 100 fits within the shallow groove 102 of ring 84. Care must be given to ensure the meshing of the jagged surfaces of the split ring. A smooth, flat surface 84S capable of sealing is provided by the joined ring 84.

Two halves of stationary holder 82, also referred to as a clamp ring 82, are then brought together from the outside, and are press fitted around tubular extension 78. The inner diameter of the two halves of stationary holder 82 are preferably lightly lubricated with silicone grease, but only at the area immediately surrounding the split.

FIG. 5C illustrates how the two halves 82A and 82B are bolted together by a bolt 158 which fits through hole 86 in holder half 82A and screws into a threaded bore 160 in the complementary holder half 82B. Socket head 162 of bolt 158 abut against the surface 164 of a recess 166 cut out from the circumference of the end of holder half 82A. Screwing the bolt 158 into the threaded bore 160 brings the head 162 within the recess 166 to obtain a relatively uniform circumferential profile. The holder 82 is screwed together loosely by tightening the screws only a few threads. The split in holder 82 should be circumferentially aligned approximately with the split of the sealing ring 84. The bolt 158 is not visible in a side view of holder 84.

The diametrically opposed ends of holder halves 82A and 82B are joined in an identical manner except that the recess 166 is cut out of the holder half 82B and the threaded bore 160 is in holder half 84A, similar to the gland plate halves 60A and 60B described above with reference to FIG. 4B. The assembly of the seal according to the invention proceeds much more easily and with fewer pieces to retain in place during the assembly process than in assembly of presently known split seals.

Referring again to FIG. 4A, the gap between shaft 16 and the inner diameter of stationary sealing ring 84 around the circumference must be carefully checked to ensure a concentric relationship between the shaft 16 and ring 84. Axial alignment is also checked both visually and by running a fingernail along the split to see if there is a step at the joint. Careful alignment of the halves may be necessary to provide a flat sealing face 84S. The holder halves are then tightened by screwing bolts 158 until the ends of the holder halves completely touch, checking the radial axial and circumferential alignment of the sealing ring 84 frequently. Gland plate assembly 60 is then tightened down by fully screwing in bolts 63 within bore 66 of the housing 24. Tightening bolts 158 forms a complete mating ring assembly 80 which is ready to be pre-stressed using the compression gear 167 illustrated in FIG. 5D.

FIG. 5D shows in detail a compression gear 167 having predetermined dimensions for setting the desired axial spring force of sealing element 74. Compression gear 167 comprises a hollow, cylindrical tube having a hollow bore 168 and an annular flange 169 extending from one end of gear 167. The hollow bore 168 has a diameter which is large enough to permit easy passage of a bolt 170 through it The bolt 170 is screw-threaded and screws into a screw-threaded bore 172 (see FIG. 4B) in gland plate assembly 60, which is spaced from bores 64. Tightening nut 174 translates holder 82 toward the housing 24 and necessarily stresses the transition section 76 of sealing element 74 causing it to become stressed.

A plurality of compression gears 167 are disposed around the circumference of gland plate 60. Preferably four compression gears 167, spaced at 90° to each other, will permit even compression of the compression ring/sealing element 74 around the circumference of the holder 82. Careful monitoring of the axial position of the holder 82 relative to housing 24, also referred to as a "working height," may be necessary to ensure proper installation.

Evenly tightening the nuts 174 further translates the compression gears 167, the flanges 169 of which engage and translate flanges 83 on the outer diameter of holder 82, to a desired axial position or "working height". For a shaft size of about 6 inches diameter, it has been found that a working height of about 2.6 inches is appropriate, with the nut 174 having a hollow bore 168 of sufficient length to provide the appropriate working height. A pressure of approximately 150–300 pound load is then provided on the compression ring/sealing element 74, with approximately a 225 pound load being optional for a shaft having a diameter of 6 inches.

Referring again to FIG. 4A, the next step in the assembly is the insertion of the rotating mating ring assembly 104 around shaft 16. Rotating primary ring 106 is first split according to the technique described above with reference to FIG. 5B. For larger shaft diameter installations, the two halves of rotating ring 106 can be joined at their ends and taped together around shaft 16 to facilitate assembly. Sealing element 112 is then wrapped around ring 106 and the two halves of rotating holder 126 are brought around the shaft and the sealing element 112. The sealing element 112 is preferably cut at an angle to the perpendicular so the pressure of the assembled holder 126 squeezes the wedges of the cut sealing member 112 and provides a better seal. Alternatively, a rounded or dovetailed end is cut, with the two ends interlocking as shown in FIG. 5A, to provide an annular seal having good sealing characteristics.

Bolts (not shown) are fit through holes 134 and 138 and loosely screwed into the corresponding screw-threaded holes (not shown) in the complementary half of rotating holder 126. Reference to FIG. 5C which describes assembly of the stationary holder provides guidance with respect to the assembly of split seal elements. The bolts should be screwed in loose enough to permit the primary ring assembly 104 to slide axially along shaft 16 with little effort. It is important to verify that sealing face 106S is perpendicular to the axis of the shaft 16 at this stage and all throughout the assembly of the seal.

The rotating primary ring assembly 104 is then brought toward the stationary mating ring assembly 80 until the sealing faces 84S and 106S are just barely touching. The mating ring assembly 80 is retained in a pre-stressed position by the compression ring 167, as is described with respect to FIG. 5D above.

The bolts connecting the two halves of holder 126 are then tightened completely. Tightening of the bolts which fit into holes 138 provides a clamping force on the annular flanges 140 at the base of holder 126. The friction between shaft sealing portion 120 and the shaft 16 and between flanges 140 and the shaft 16 fix the position of the assembly 104 relative to the shaft 16 in the axial and circumferential directions. Tightening of the bolt in hole 134 takes the fluid pressure created by the pump from the inner diameter of ring 84.

The structure of the inner surface of sealing element 112, and especially of the matching contour of split seal ring 106 and the inner surfaces of tubular extension 114 and transition portion 118, grips the sealing ring 106 and rigidly supports it in the axial, radial and circumferential directions. Motion of the sealing ring 106 in any direction relative to shaft 16 is thus severely inhibited during operation of the pump. The sealing element 74 also inhibits the motion of sealing ring 84 in the radial and circumferential directions but not in the axial direction. The sealing element 74 provides impetus only for axial motion of the sealing rings of the seal, i.e., for motion of the mating ring assembly 80 relative to the housing 24.

Following tightening of the bolts in holes 134 and 138, the compression gear 167 together with bolt 170 are removed and the spring force of the sealing element 74 will freely bias sealing ring 84 toward sealing ring 106. The biasing force has already been pre-stressed by the torque of bolt 170 acting on compression gear 167 and thus the precise amount of force necessary for creating the sealing capability required by the end user for the particular device is provided.

A significant feature of the invention with regard to sealing element 74 will become apparent from the above description. The sealing element 74 is split along its complete cross-sectional dimension so that it can be installed around a shaft. Both the lip 72 and the tubular extension 78 are compressed by the elements which are being sealed. That compression creates a seal which is good up to fairly high pressures. The middle section 76, however, is unsupported by any hard material elements and fluid under pressure on one side of the sealing element 74 is liable to leak through the split in the sealing element. A significant feature of this invention is the design of sealing element 74 and holder 82 which provide sufficient hoop stress in middle section 76 to counteract the moderate fluid pressures to which the sealing element 74 will be subjected. The hoop stress provides a tension between the lip 72 and extension 78. Flanged portion 90 of the holder 82 provides an inwardly radial stress to middle section 76 that tightens the junction of the two split ends to seal fluid under moderate pressure from leaking through sealing element 74.

The last step in the assembly of the seal is the fitting of the guard 142 over flange 83. Guard 142 also comprises a split elastomeric element and has two ends which are brought together and joined by stapling, gluing or other appropriate means. The guard provides protection of the seal faces from the ambient environment and also acts as a shield for fluid which is slung from the rotating face 106S.

The composition of the materials for each separate component can be customized to achieve the appropriate sealing capability desired by the end user. The gland plate assembly 60 and each of the holders 82 and 126 comprise a hard material such as metal, preferably a noncorrosive metal such as stainless steel. Bolts, nuts and other connectors are also preferably stainless steel.

Typically, the sealing rings 84 and 106 may be made from an appropriate material, such as carbon, ceramic, silicon carbide or tungsten carbide. Combinations of ring materials for each of the rings 84 and 106 are also possible. For example, two silicon carbide rings may be used, or one ring may be made of carbon and the other of ceramic. Other materials may be substituted for those set forth above, as is known in the art.

The sealing elements 74 and 112 comprise a resilient, somewhat flexible elastomeric material. An ethylene-propylene (EPDM) compound having the brand name CRANELAST, sold by John Crane Inc., has been found to work well. Other elastomeric compounds such as Buna-N or AFLAS, available from 3M Corporation, have also worked well in the past as sealing element material, and other materials are known to those skilled in the art. The materials used in the elastomeric elements are chosen with a view toward the fluid which the equipment is intended to pump so that no adverse chemical or physical reaction will result between the elastomeric material and the fluid.

Another important aspect of the invention during operation is the flexing capability of the sealing elements of each of the rings. Shaft 16 is normally susceptible to some play in its axial direction as it rotates, and it may also experience runout conditions. The shape of split sealing element 74 permits it to automatically compensate for these conditions.

Figure 6:
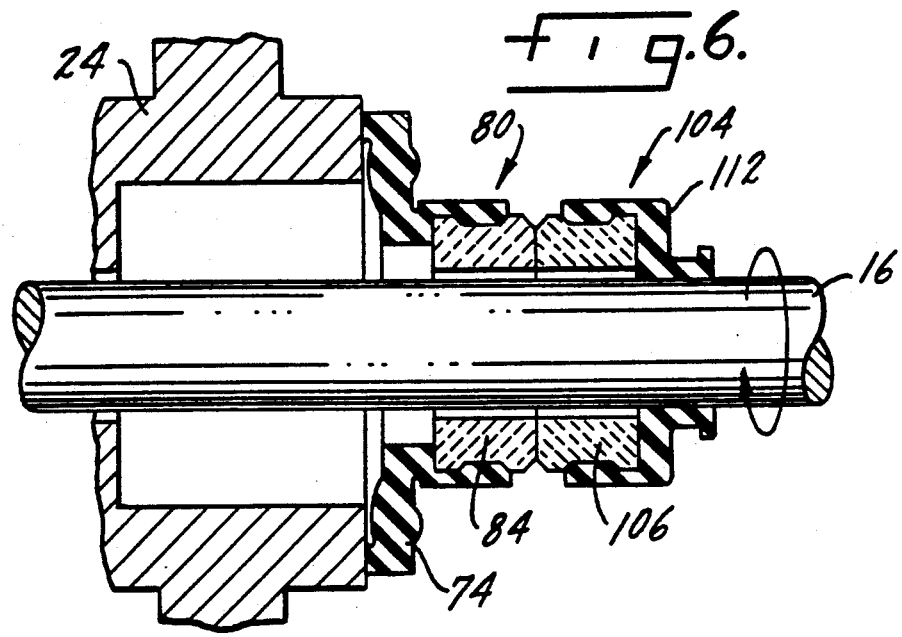
FIGS. 6 and 7 schematically illustrate the compensating characteristics of the present invention during periods of misalignment between the shaft and the stuffing box housing.
Figure 7:
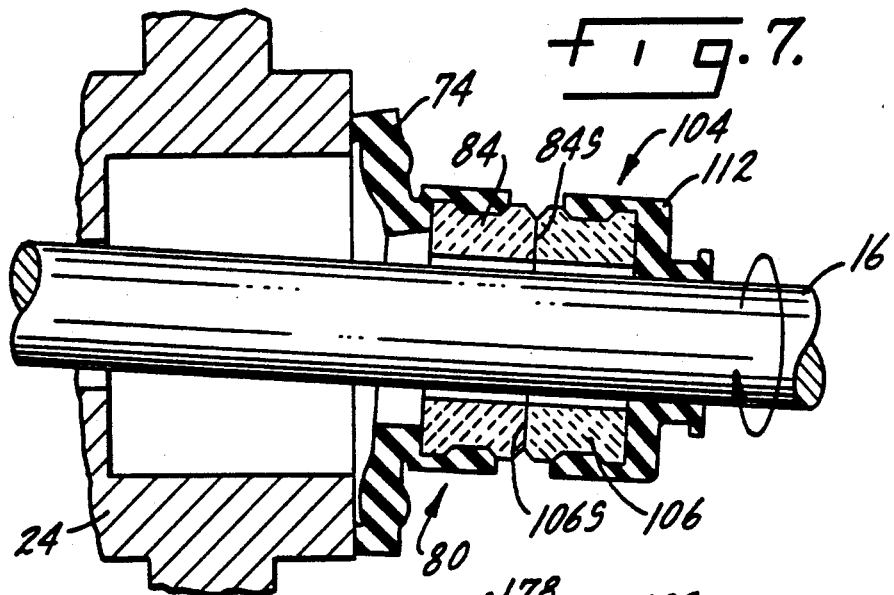

Transient or permanent misalignment of the shaft axis relative to the stuffing box housing 24 is compensated by the spring force of the mating ring sealing element 74. Moreover, the shape of the sealing element 74 permits it to provide support to the stationary mating split seal ring 84 in the radial an circumferential directions. The sealing element spring force further provides a bias to the ring 84 in the axial direction around all of its circumference within certain parameters. FIGS. 6 and 7 schematically illustrate a shaft 16 which is in, respectively, aligned and misaligned positions with reference to the stuffing box housing 24.

Under aligned conditions, as illustrated in FIG. 6, there is essentially circular symmetry all around the sealing ring assemblies 80 and 104. In particular, the mating ring 84 has an identical spacing and angular position relative to the stuffing box housing 24 around the complete circumference of the ring assembly.

FIG. 7 illustrates in exaggerated form a misaligned shaft 16 relative to the housing 24. The misalignment has been so positioned that the greatest angle of misalignment is shown in the plane through which the cross section has been taken. The distortion of sealing element 74 has been exaggerated to better illustrate the effective operation of the invention.

As shown schematically in FIG. 7, the stationary mating ring 84 has been angularly displaced from the position shown in FIG. 6, to maintain a parallel relationship between sealing faces 84S and 106S. Axial spring force from the sealing element 74 on ring 84 maintains a positive static seal condition of the sealing faces 84S and 106S at all times during rotation of the shaft 16. The seal is static because the sealing element 74 is compressed to the same degree all around the circumference of the sealing element 74 through a complete rotation of the shaft 16. Other than for the transient events, the sealing element 74 does not distort during any portion of the rotation of the shaft 16. The shape and position of sealing element 74 remains in approximately the same position shown in FIG. 7. Transient conditions may cause the sealing element 74 to temporarily compress or expand, but on average, little distortion of the sealing element 74 will take place. Thus operation of the seal will avoid early failure from deterioration of the sealing element 74 caused by continual flexing due to shaft rotation.

FIG. 7 further illustrates the importance of a perpendicular alignment sealing face 106S of ring 106 with respect to the axis of shaft 16. As shaft 16 rotates, a perpendicularly aligned sealing face 106S will rotate in a plane which does not precess or oscillate. On the other hand, deviation from a perpendicular relationship will cause an axial oscillation of the sealing face 106S. The oscillation will be frequency dependent on the speed of the shaft rotation, which can exceed 300 revolutions per minute. The response time of the axial spring force provided by sealing element 74 can compensate for some precession or oscillation, but at higher frequencies, the oscillations will tend to maintain a gap between seal faces 84S and 106S which is larger than desired for effective sealing. Continued and extended rotation of the shaft and nonperpendicularly aligned sealing face will lead to aging and wearing out of the resiliency of sealing element 74. It is therefore important to provide as close to a perpendicular relationship between sealing face 106S and the axis of shaft 16 as is possible.

As illustrated in the view of FIG. 7, the resiliency of the elastomeric material forming sealing element 74 provides a varying amount of axial spring force on different portions of the circumference of assembly 80. However, the inertial momentum provided by the weight of holder 82 (not shown in FIG. 7 for purposes of clarity) maintains a relatively uniform axial biasing force on the ring 84 to keep the sealing face 84S in substantially the same plane as the sealing face 106S of rotating ring 106.

Although this invention has been described with reference to conversion of an exemplary pump having a stuffing bore, other applications will readily come to mind of a person of skill in the art. The versatility of a split seal configuration lends itself to many varied applications. Its use is appropriate wherever a mechanical face seal must be installed without requiring the breakdown of the equipment on which it is mounted. Other uses with appropriate modifications are contemplated in tight fitting quarters where removal of a housing or of a shaft attachment is difficult or impossible, as well as where access to the shaft end is difficult.

The advantages of the inventive split seal are apparent to those of skill in the art, and include the capability to quickly, easily and efficiently install or replace packing or a defective seal. The inventive seals are susceptible to being used to much greater pressure than heretofore permitted by packing. The inventive seal also provides for adjustable parameters, such as the spring force provided by the sealing element 74.

The sealing requirements for a particular pump or turbine may change because of a change in the fluid that is being sealed. Continued use of a split seal made according to the present invention may cause the sealing element 74 to age and its spring force to decrease. To adjust for this eventuality, the rotating ring assembly 104 can be axially shifted relative to stuffing box housing 24 until the desired pressure is achieved. This procedure provides a greater useful life to the spring and flexibility to the pump user. When the rotating primary ring assembly can no longer compensate for wear by shifting for a deteriorated sealing element 74, all of the component parts of the split seal can be removed easily and replaced by new parts.

The seal according to the present invention can be installed in tight places, since it has a very short axial length. Reduction in weight of sealing materials in excess of 90% have also been provided by the inventive split seals over other retrofitted seals.

Other modifications to the invention are possible and will become apparent from the requirements of an end user. For example, certain pumps or turbines have shafts which are subjected to greater than normal axial shifts during use. The shifts may exceed a predetermined amount which can be compensated for by flexing of the sealing element 74 of FIGS. 4A and 4C.

Figure 8:
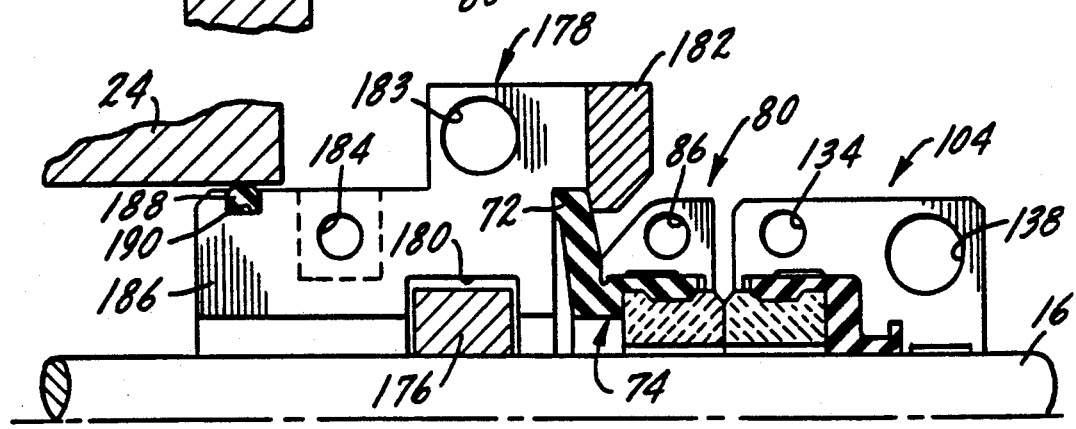
FIG. 8 illustrates an alternate embodiment of the present invention utilizing a thrust bearing.

As is illustrated in FIG. 8, a thrust bearing 176 may be welded or clamped around the shaft 16. Instead of a gland plate assembly, an adaptor ring 178 is disposed around the shaft 16 and an annular groove 180 provides a loose fitting collar for the thrust bearing 176. An adapted gland plate 182 is suitably attached to the adapter ring 178 and squeezably retains lip 72 against the adapter ring 178. The remaining elements of the seal ring assemblies 80 and 104 are identical to those described above.

Thrust bearing 176 acts to maintain an appropriate axial position of the adapter ring 178 relative to the shaft. Rotation of the shaft 16 and the thrust bearing 176 does not affect the adapter ring 178 since there is only a slight frictional contact between the annular groove 180 of ring adapter 178 which defines the collar and the thrust bearing 176. As the shaft 16 and thrust bearing 176 are axially translated, one or the other of the radial surfaces of the thrust bearing also translates the collar and ring adapter in the direction which the shaft is moving. The movement of the ring adapter 178 also necessarily will translate the stationary mating ring assembly 80. Of course, rotating ring assembly 104 fixedly attached t shaft 16 will be translated by axial motion of the shaft.

Ring adapter 178 also is a split element and requires a bolt to be inserted through the bolt holes 183 and 184 for joining the two halves together. The structure and procedure is similar to the bolts utilized in holes 86, 134 and 138. A tubular extension portion 186 of ring adapter 178 fits slidably within the stuffing box housing 24. The housing 24 and ring adapter 178 encloses an 0-ring 188 within an annular groove 190 at the end of the extension portion 178 which creates a seal in the fluid path between the housing and the adapter.

Figure 9:
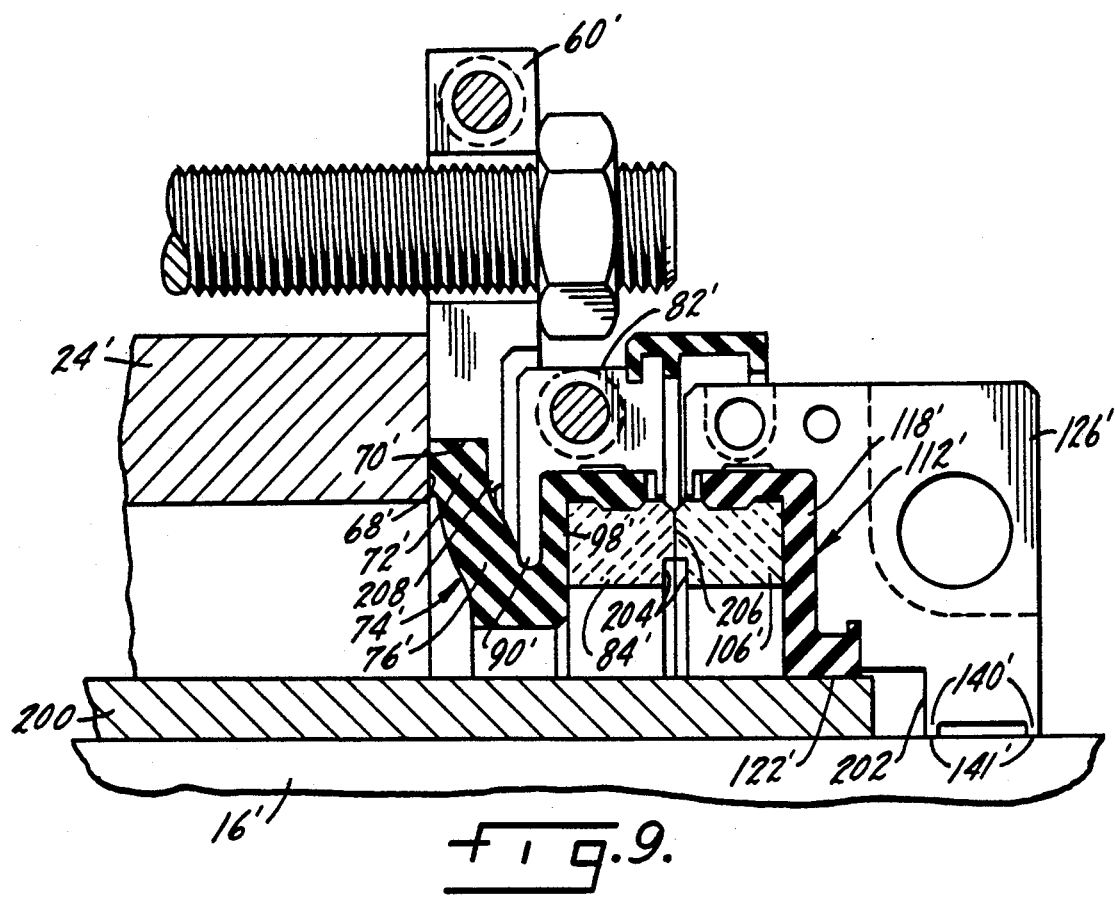
FIG. 9 illustrates an alternate embodiment of the present invention having a balanced seal configuration in the split seal.

Alternative embodiments of the inventive split seal may be designed for particular needs or requirements of specific industries and applications. FIG. 9 illustrates a variation of the split seal illustrated in FIG. 4A, where like elements are indicated by identical numerals having a prime annotation.

The embodiment of FIG. 9 has been particularly designed for applications having large shaft diameters. It has been found to work particularly well for seals installed with shaft diameters of between 7 inches to about 30 inches.

The embodiment shown in FIG. 9 is different from that of FIG. 4A in several respects. In particular, the FIG. 9 embodiment introduces a sleeve 200 on which rests the inside surface 122' of the shaft sealing portion of sealing element 112'. The rotating holder 126' has a step 202 which accommodates the sleeve 200. The annular supports 140' of holder 126' directly contact the shaft 16' at the inside surfaces 141'.

Other specific differences become apparent from a close comparison of the two embodiments of FIGS. 9 and 4A. The flanged portion 98' of sealing element 74' is longer in cross section, and of wider diameter when viewed along the centerline, so as to allow greater distance between the shaft 16' and the stationary ring 84'. The flange member 90' of stationary holder 82' is correspondingly longer in the cross-sectional view of FIG. 9. The flange member 90' provides a closer fit and greater support to ring 84' by biasing the sealing element flanged portion 98' against the ring 84'. This arrangement of the longer flanged members 90',98' provides increased hoop stress to both the middle section 76' and the intermediate part between the middle section 76' and the flanged portion 98'.

Similarly, transition portion 118' is correspondingly longer in cross section and is also matched by a wider axial diameter of the rotating holder 126', which provides support to rotating ring 106'.

It is also important to note the recessed grooves 204 in each of the inner diameters of rings 80' and 106'. Grooves 204 cause the rings 84' and 106' to contact each other only at a surface 206 close to the ring outer diameters.

Another difference shown in the embodiment of FIG. 9 is the wider axial diameter of the gland plate 60', which includes an annular flange extension 208 at the inner diameter of the gland plate 60'. Moreover, the recessed inner diameter 70' of the gland plate 60' is deeper and encompasses the majority of the sealing lip 72'. The protruding flange extension 208 extends inwardly from the inner recessed diameter 70' and firmly engages lip 72' to create a seal against the lateral surface 68 of the housing wall. This arrangement is designed to withstand higher pressures generated by the device which is being sealed. In most other respects the seal shown in FIG. 9 is identical to the embodiment shown in FIG. 4A.

The design of the embodiment of FIG. 9 is balanced and permits the seal to be used with shafts of greater diameter. The seal is further able to withstand somewhat higher pressures. The balanced design results from the approximately equal pressure which is exerted on the contact faces 206 of the rings 84' and 106' and on the pressure side of the seal. The pressure side abuts the shaft sleeve 200 and stuffing box housing 24', and the seal separates the pressure side from the atmosphere. The pressure from opposite sides of the ring 84' is exerted in opposite directions and tends to cancel out the total fluid pressure on the stationary ring assembly. Only the biasing force of the sealing element 74' provides the force acting on the stationary ring 84'.

Other alternative arrangements of the sealing components of the invention may be utilized. For example, appreciation of the present invention may be used to design an O.D. pressurized seal arrangement. Once the inventive concepts described above are understood, other embodiments and modifications will become readily apparent to a person of ordinary skill in the art. Accordingly, the above embodiments are described and discussed as examples and do not limit the scope of the following claims.

What is claimed is:

1. A split mechanical face seal for providing fluid-tight sealing between a housing and a shaft adapted to rotate relative thereto, said split seal comprising:

(a) adjacent, rigid, annular primary and mating rings each defining generally radial opposed sealing faces, each of said rings having a plurality of arcuate ring segments and means for joining and retaining the segments of each said ring, whereby each said opposing sealing face defined by said rings has a smooth surface devoid of discontinuities around the complete circumference of each said annular ring;

(b) a plurality of resilient split means for positioning and supporting each of said rings in generally coaxial relationship with the shaft and with the other said ring, said positioning means defining the relative positions of said rings so that the sealing face of each said ring is in opposite and facing relationship to the sealing face of the other said ring, one of said postioning means rigidly supporting said primary ring and the other of said positioning means non-rigidly supporting and biasing said mating ring in an axial direction against said primary ring; and (c) a plurality of split holder means for circumferentially supporting each said means for postioning in a substantially concentric relationship to the respective ring, said split holder means comprising a pair of semicircular holder members releasably attachable to each other and when in an attached condition, sealingly engaging and compressing to a limited degree at least a portion of said respective resilient positioning means, wherein said resilient means for positioning said mating ring and said respective holder member supporting said mating ring are shaped and dimensioned to inhibit translation of said mating ring in the radial and circumferential direction relative to the housing and to provide to the mating ring and to said respective holder member a limited range of translation in the axial direction relative to the housing.

2. The split mechanical face seal according to claim 1 wherein said mating ring is stationary relative to the housing and the primary ring is rotating with the shaft.

3. The split mechanical face seal according to claim 1 wherein said resilient split means for positioning and non-rigidly supporting said mating ring provides a fluid seal between said mating ring and the housing.

4. The split mechanical face seal according to claim 2 wherein said resilient split means for positioning and rigidly supporting said primary ring provides a fluid seal between said primary ring and the shaft.

5. The split mechanical face seal according to claim 4 wherein said resilient means for positioning further comprises an orientation means orienting the position of said primary ring so that said primary ring sealing face is substantially perpendicular to a longitudinal shaft axis.

6. The split mechanical faces seal according to claim 1 wherein each said resilient means for positioning comprises an elastomeric member disposed in a circumferential retaining portion of said respective holder, said elastomeric member having at least one cut through its body, said resilient means for positioning comprising a fluid seal between each said respective holder and each said ring supported by said respective resilient means for positioning.

7. The split mechanical face seal according to claim 1 wherein said resilient split means for positioning said primary ring and said respective holder members supporting said primary ring are shaped and dimensioned to inhibit translation of said primary ring in the axial, radial and circumferential directions relative to the shaft.

8. The split mechanical face seal according to claim 1 wherein the split resilient means for positioning said mating ring provides a biasing force to said primary ring in the axial direction and the axial position of said primary ring along the shaft determines the amount of biasing force provided by said resilient means for positioning and biasing said mating ring.

9. The split mechanical face seal according to claim 1 further comprising an annular adapter member having a keyway for receiving a thrust bearing disposed around the shaft, the keyway being shaped and dimensioned to provide a corresponding axial shift to said adapter member when the shaft and the thrust bearing are axially shifted, said adapter member being in sealing engagement with one of said resilient split positioning means.

10. The split mechanical face seal according to claim 9 wherein said adapter member further comprises means to sealingly engage the housing and said adapter member is axially translatable with respect to the housing while simultaneously maintaining sealing engagement therewith.

11. A split mechanical face seal for providing fluid-tight sealing between a housing and a shaft adapted to rotate relative thereto, said mechanical seal comprising:
 (a) a plurality of arcuate first ring sections which complement each other to form an annular primary ring defining a generally radial first sealing face;
 (b) a plurality of arcuate second ring sections which complement each other to form an annular mating ring defining a generally radial second sealing face, said second sealing face, when assembled, opposing said first sealing face in a sealing relation;
 (c) a first sealing means for sealing a fluid flow path between said primary ring and the shaft;
 (d) a second sealing means for sealing a fluid flow path between said mating ring and the housing, said second sealing means being adapted to provide an axial biasing force to said mating ring whereby said second sealing means biases said mating ring in an axial direction relative to the housing and thereby maintains contact between said first sealing face and said second sealing face; and
 (e) a plurality of split holder means at least one each for circumferentially supporting each said sealing means and each said ring in a substantially concentric relationship to the respective ring, each said split holder means comprising a pair of semicircular members releasably attachable to each other and when in an attached condition, sealingly engaging and compressing to a limited degree at least a portion of said respective first and second sealing means, wherein said second sealing means and said respective holder means supporting said mating ring are shaped and dimensioned to inhibit translation of said mating ring in the radial and circumferential direction relative to the housing and further shaped and dimensioned to provide a limited range of translation to said mating ring and to said respective holder means in the axial direction relative to the housing.

12. The split mechanical face seal according to claim 11 wherein said first sealing means rigidly supports said primary ring on the shaft and said second sealing means non-rigidly supports said mating ring and biases said mating ring in an axial direction whereby said mating ring sealing face is biased against said primary ring sealing face.

13. The split mechanical face seal according to claim 12 wherein said primary ring rotates together with the shaft during operation and said first sealing means comprises an orientation means orienting the position of said primary ring so that the primary ring sealing face is substantially perpendicular to a longitudinal shaft axis.

14. The split mechanical face seal according to claim 11 wherein each said sealing means comprises an elastomeric member disposed in a circumferential retaining portion of said respective holder means with each said member having at least one cut through the complete body defining said elastomeric member, said first and second sealing means comprising a fluid seal between each said respective holder means and each said ring supported by said respective first or second sealing means.

15. The split mechanical face seal according to claim 11 wherein said first sealing means and said respective holder means supporting said primary ring are shaped and dimensioned to inhibit translation of the primary ring in the axial, radial and circumferential directions relative to the shaft.

16. The split mechanical face seal according to claim 11 wherein said second sealing means provides a biasing force to said mating ring in the axial direction such that the axial position of said mating ring relative to the shaft determines the amount of biasing force provided by said second sealing means supporting and biasing said mating ring.

17. The split mechanical face seal according to claim 11 wherein said second sealing means comprises an annular adapter member having a keyway for receiving a thrust bearing disposed around the shaft, the keyway being shaped and dimensioned to provide a corresponding axial shift to said adapter member when the shaft and the thrust bearing are axially shifted, said second sealing means further comprises a resilient sealing element sealingly engaging said adapter member and further sealingly engaging and biasing said annular mating ring in the axial direction relative to the shaft.

18. The split mechanical face seal according to claim 17 wherein said adapter member further comprises means to sealingly engage the housing and is axially translatable with respect to the housing while maintaining sealing engagement therewith.

19. A split mechanical face seal for providing fluid-tight sealing between a housing and a shaft adapted to rotate relative thereto, said split seal comprising:
 (a) adjacent, rigid, annular primary and mating rings each defining generally radial opposed sealing faces, each of said rings having a plurality of arcuate ring segments and means for joining and retaining the segments of each of said rings in rigid connection with the other segments of each said ring, whereby each said opposed sealing face defined by said rings has a smooth surface devoid of discontinuities around the complete circumference of each said annular ring;
 (b) a first and second split resilient positioning means for supporting each respective said ring in a generally coaxial relationship with the shaft or the housing, respectively, and with the other said ring, said first positioning means simultaneously inhibiting translation of said primary ring in radial, axial and circumferential directions, said second positioning means inhibiting translation of said mating ring in radial and circumferential directions, and said positioning means defining the relative positions of said rings so that the sealing face of each said ring is in opposite and facing relationship to the sealing face of the other said ring; and
 (c) split retaining elements having rigid walls that retain each respective resilient positioning means in concentric relationship to the respective primary and mating rings, said split retaining elements comprising a pair of semicircular holder members releasably attached to each other and when in an attached condition, sealingly engaging and compressing to a limited degree at least a portion of said respective resilient postioning means, said second resilient positioning means being shaped and dimensioned to inhibit translation of said mating ring in the radial and circumferential direction relative to said housing and to provide to the mating ring and to the respective retaining element a limited range of translation in the axial direction relative to the housing.

20. The split mechanical face seal according to claim 19 wherein said second resilient positioning means further is shaped and dimensioned to provide an axial biasing force for biasing the mating ring toward said primary ring whereby the sealing faces of said rings are brought into mating contact.

21. The split mechanical face seal according to claim 20 wherein each said retaining element is indirectly connected to the respective shaft or housing.

22. The split mechanical face seal according to claim 19 further comprising an annular adapter member having a keyway for receiving a thrust bearing disposed around the shaft, the keyway being shaped and dimensioned to provide a corresponding axial shift to said adapter member when the shaft and the thrust bearing are axially shifted, said adapter member being in sealing engagement with one of said positioning means.

23. The split mechanical face seal according to claim 22 wherein said adapter member further comprises means to sealingly engage the stuffing box housing and is axially translatable with respect to the stuffing box housing while simultaneously maintaining sealing engagement therewith.

24. The split mechanical face seal according to claim 23 wherein said adapter member is in sealing engagement with said second positioning means, said second positioning means biasing said annular mating ring in an axial direction relative to the housing.

* * * * *